(12) United States Patent
Wuzik et al.

(10) Patent No.: US 7,066,993 B2
(45) Date of Patent: Jun. 27, 2006

(54) COLORANT COMPOSITION

(75) Inventors: Andreas Wuzik, Untermeitingen (DE); Josef Geisenberger, Sulzbach (DE); Heidemarie Menzel, Bad Soden (DE)

(73) Assignee: Clariant GmbH, Frankfurt (DE)

( * ) Notice: Subject to any disclaimer, the term of this patent is extended or adjusted under 35 U.S.C. 154(b) by 282 days.

(21) Appl. No.: 10/468,253

(22) PCT Filed: Feb. 12, 2002

(86) PCT No.: PCT/EP02/01436

§ 371 (c)(1), (2), (4) Date: Aug. 11, 2003

(87) PCT Pub. No.: WO02/064679

PCT Pub. Date: Aug. 22, 2002

(65) Prior Publication Data

US 2004/0074018 A1 Apr. 22, 2004

(30) Foreign Application Priority Data

Feb. 14, 2001 (DE) .......................... 101 06 682

(51) Int. Cl.
*C09D 11/02* (2006.01)

(52) U.S. Cl. ................. 106/31.51; 106/31.43; 106/31.46; 106/31.48; 106/31.5; 8/543

(58) Field of Classification Search ............. 106/31.51, 106/31.43, 31.46, 31.48, 31.5; 8/543
See application file for complete search history.

(56) References Cited

U.S. PATENT DOCUMENTS

| 3,345,122 | A | | 10/1967 | Meininger et al. ............. 8/547 |
| 3,788,801 | A | | 1/1974 | Hill et al. ...................... 8/543 |
| 4,058,515 | A | | 11/1977 | Stingl et al. ................. 534/651 |
| 5,102,459 | A | | 4/1992 | Ritter et al. ................. 106/31.5 |
| 6,265,554 | B1 | * | 7/2001 | Lehmann et al. ............ 534/629 |
| 6,458,195 | B1 | * | 10/2002 | Stoffel et al. ............. 106/31.51 |
| 6,521,032 | B1 | * | 2/2003 | Lehmann et al. ......... 106/31.51 |
| 6,596,067 | B1 | * | 7/2003 | Menzel et al. ............. 106/31.51 |
| 6,793,722 | B1 | * | 9/2004 | Chien et al. .............. 106/31.27 |
| 6,808,555 | B1 | * | 10/2004 | Wang et al. .............. 106/31.43 |
| 2002/0001179 | A1 | * | 1/2002 | Menzel et al. ............ 106/31.51 |
| 2004/0123772 | A1 | * | 7/2004 | Zimmer et al. ........... 106/31.51 |
| 2004/0128775 | A1 | | 7/2004 | Wuzik et al. ................. 8/583 |

FOREIGN PATENT DOCUMENTS

| DE | 236336 | 6/1986 |
| EP | 0312004 | 4/1989 |
| WO | WO 9405688 | 3/1994 |
| WO | WO 9732933 | 10/1997 |
| WO | WO 0009615 | 2/2000 |

OTHER PUBLICATIONS

Gregory, "Topics in Applied Chemistry: High Technology Applications of Organic Colorants," Micro Color Filters Ch. 2, Plenum Press, New York, pp. 15–25 (1991), no month available.

* cited by examiner

*Primary Examiner*—Helene Klemanski
(74) *Attorney, Agent, or Firm*—Anthony A. Bisulca

(57) ABSTRACT

The invention relates to a colorant composition that substantially comprises a colorant of formula (1) and a colorant formula (2) or (3). The magenta colorant mixture is advantageously used in ink-jet printing and yields storage-stable and water-proof ink formulations.

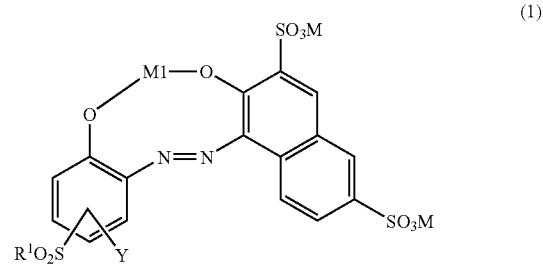

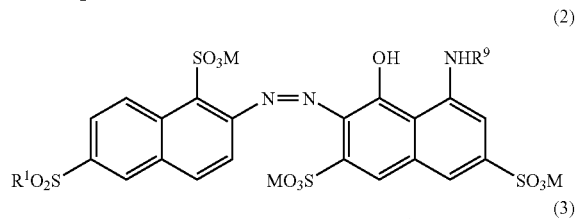

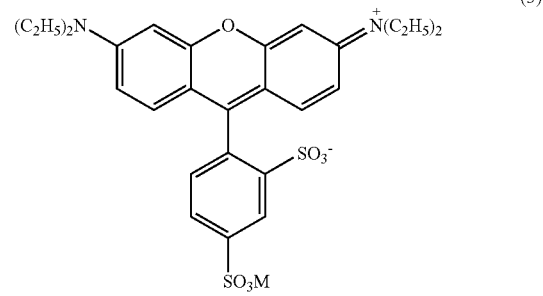

17 Claims, No Drawings

COLORANT COMPOSITION

The invention relates to the field of colorants, particularly for use in recording liquids for writing and recording apparatus, for ink-jet printing processes, for example.

The ink-jet process is a contactless printing process in which droplets of the recording liquid are guided from one or more nozzles onto the substrate where printing is to take place. In order to obtain prints of high definition and resolution, the recording liquids and the colorants present therein are required to meet stringent requirements, particularly in regard to purity, freedom from particles, solubility, stability on storage, viscosity, surface tension, and conductivity. Very stringent requirements are imposed in particular on color strength, shade, brilliance and fastness properties such as light fastness, water fastness, and rub fastness, for example. High light fastness in particular is of great importance for exterior ink-jet applications and for the production of ink-jet prints of photographic quality.

Viewing ink formulations in the context of multi-color printing, an additional problem is that the dyes used in the inks must correspond as exactly as possible to the three primary colors yellow, magenta, and cyan. The selection of suitable dyes is restricted not only by the required shade but also by the necessary purity of the hue and the desired brilliance of the color reproduction. To date, however, it has been impossible to develop an ink composition which possesses all of the desired properties in an ideal manner and can be successfully employed in practice.

The facts of the case may be illustrated using the example of inks of magenta shade. In conventional inks based on water-soluble magenta dyes use is made, for example, of direct dyes, such as C.I. Direct Red 1, 11, 37, 62, 75, 81, 87, 89, 95 and 227. Owing to the substantivity of the direct dyes, inks produced from direct dyes are of excellent water resistance, but harbor two disadvantages: owing to their solubility in water, the clogging of the nozzle by precipitated dye occurs readily during continuous printing or in the case of intermittent use. Furthermore, the development of aggregation is observed to an increased extent, giving rise to turbid shades and so leading to unsatisfactory color reproduction.

Furthermore, the use of acidic dyes, such as C.I. Acid Red 1, 8, 52, 87, 94, 115, 131, 144, 152, 186 and 245, for example, has also been investigated, with the result that, although good color reproduction is achieved, the durability of the printed images is inadequate owing to the low levels of light stability and water resistance.

EP-A-0 312 004 discloses recording liquids which can comprise reactive dyes. However, prints with water-soluble reactive dyes generally lack optimal water resistance, with the formation of chloride ions or sulfate ions through hydrolysis of the reactive groups having an additional adverse effect.

Besides dyes it is also possible to employ pigments of high light fastness as colorants in ink-jet inks, such as, for example, C.I. Pigment Red 122, C.I. Pigment Red 176, C.I. Pigment Red 184, 185 or C.I. Pigment Red 269. A disadvantage found is that prints obtained were not very brilliant.

There is therefore a need for improved recording liquids which are superior to the existing magenta-colored inks particularly in shade, in stability on storage, and in water resistance and which at the same time have the other properties required for the ink-jet sector.

Surprisingly it has been found that the requirements imposed can be met if the dye mixtures defined below are used.

The present invention provides dye mixtures consisting essentially of a dye of the formula (1) and a dye of the formula (2) or (3)

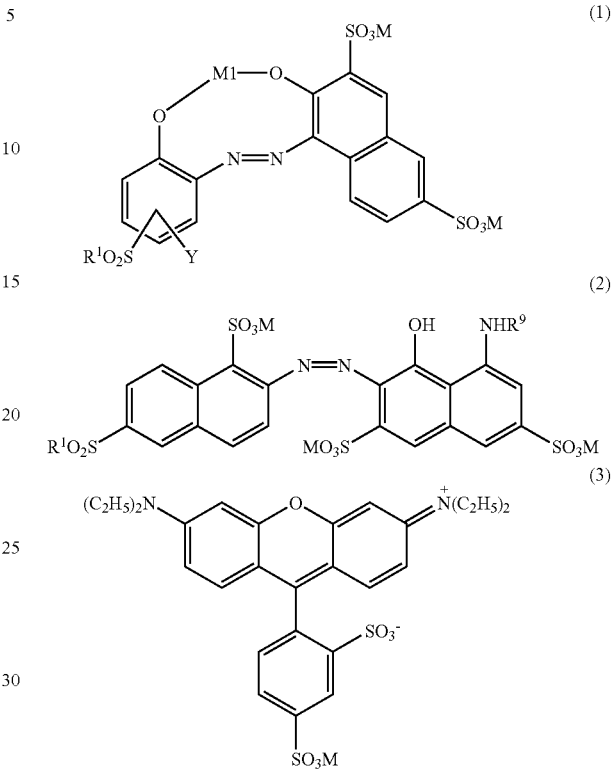

in which
Y is H, $(C_1-C_6)$-alkyl or $(C_1-C_6)$-alkoxy,
$R^1$ is OM, CH=$CH_2$, $CH_2CH_2OR^2$, $CH_2CH_2NR^3R^4$, $CH_2CH_2SR^5$ or $CH_2CH_2CR^6R^7R^8$,
$R^2$ is H, $SO_3M$, $(C_1-C_6)$-alkyl, $(C_1-C_6)$-alkyl which is branched or unbranched and is unsubstituted or substituted by one or more, for example 1, 2 or 3, radicals from the group consisting of OH, $NH_2$, COOM and $SO_3M$; $(C_1-C_6)$-acyl, $(C_6-C_{10})$-aryl, $C_6-C_{10}$-aryl which is substituted by one or more, for example, 1, 2 or 3, radicals from the group consisting of halogen, OH, $NH_2$, COOM and $SO_3M$; or 5–10-membered heterocycles having 1 to 4 heteroatoms from the group consisting of O, N and S;
$R^3$ and $R^4$ independently of one another are H, $(C_1-C_6)$-alkyl, $(C_1-C_6)$alkyl which is unbranched or branched and unsubstituted or substituted by one or more, for example 1, 2 or 3 radicals consisting of the group OH, $NH_2$, COOM and $SO_3M$; $(C_1-C_6)$-acyl, $C_6-C_{10}$-aryl, $C_6-C_{10}$-aryl substituted by one or more, for example 1, 2 or 3 radicals from the group consisting of OH, halogen, $NH_2$, COOM and $SO_3M$;
$R^5$ is $(C_1-C_6)$-alkyl, $(C_1-C_6)$-alkyl which is unbranched or branched and unsubstituted or substituted: by one or more, for example 1, 2 or 3 radicals consisting of the group OH, $NH_2$, COOM and $SO_3M$; $(C_1-C_6)$-acyl, $C_6-C_{10}$-aryl, $C_6-C_{10}$-aryl substituted by one or more, for example 1, 2 or 3 radicals from the group consisting of OH, halogen, $NH_2$, COOM and $SO_3M$;
$R^6$, $R^7$, $R^8$ independently of one another are H, $(C_1-C_6)$-alkyl or are $(C_1-C_6)$-alkyl substituted by one or more, for example, 1, 2 or 3, radicals from the group consisting of halogen, OM, $NH_2$, $COOCH_3$, COOM and $SO_3M$;
$R^9$ is H, $(C_1-C_6)$-alkyl, a $(C_1-C_6)$-alkyl which is unbranched or branched and is substituted by one or more, for example, 1, 2 or 3, radicals from the group consisting of OH, $NH_2$, COOM and $SO_3M$; $(C_1-C_6)$-acyl, $C_6-C_{10}$-aryl, a $C_6-C_{10}$-aryl substituted by one or more, for example, 1, 2 or 3, radicals from the group consisting of OH, halogen, $NH_2$, COOM and $SO_3M$;

M1 is Cu, Co, Ni, Fe, Cr or ⅔ Al; and

M is hydrogen, a monovalent metal cation, one equivalent of a polyvalent metal cation, or an ammonium ion optionally substituted by $(C_1-C_4)$-alkyl; $(C_1-C_4)$-alkoxy-$(C_1-C_4)$-alkyl, hydroxy-$(C_1-C_4)$-alkyl, benzyl or $(C_6-C_{10})$-aryl.

M1 is preferably Cu.

M is preferably hydrogen, sodium, lithium or potassium.

Y is preferably hydrogen, methyl, ethyl, methoxy or ethoxy.

$R^1$ is preferably OH, $CH=CH_2$, $CH_2CH_2OR^2$ or $CH_2CH_2NR^3R^4$.

$R^2$ is preferably hydrogen, $SO_3M$, methyl, ethyl, acetyl, phenyl, chlorophenyl, phenylsulfonic acid, morpholinyl or pyridinyl.

$R^3$ and $R^4$ are preferably hydrogen, methyl, ethyl, hydroxymethyl, hydroxypropyl, acetyl, phenyl, chlorophenyl, phenylsulfonic acid, $CH_2CH_2SO_3M$, $CH_2COOM$, $CH_2CH_2COOM$ or $CH_3CHCOOM$.

$R^5$ is preferably methyl, ethyl, propyl, butyl, phenyl, $CH_2CH_2CH_2SO_3M$ or $CH_2CH_2COOM$.

$R^6$, $R^7$, $R^8$ are preferably hydrogen, methyl, ethyl, $CH_2CH_2OM$, $CH_2CH_2NH_2$ or COOM.

$R^9$ is preferably hydrogen, methyl, ethyl, acetyl, benzoyl, phenyl, or halogen-, COOM- or $SO_3M$-substituted phenyl or benzoyl.

Preferred proportions between the compounds of the formula (1) and (2) and also (1) and (3), based on dry weights, are between 100:1 and 1:100, preferably between 50:1 and 1:50, in particular between 10:1 and 1:10.

The compound of the formula (1) with $SO_2R^1$ positioned meta to the azo bridge and with Y being H, and also with $R^1$ being β-sulfatoethyl and M1 being Cu, is known under the name C.I. Reactive Red 23.

The compound of the formula (2) with $R^1$ being β-sulfatoethyl and $R^9$ being benzoyl is known under the name C.I. Reactive Red 180.

The compound of the formula (3) is known under the name C.I. Acid Red 52.

Preferred for the purposes of the present invention is a mixture of C.I. Reactive Red 23 and C.I. Reactive Red 180, or of C.I. Reactive Red 23 and C.I. Acid Red 52. Preferred proportions are 1:10 to 10:1, in particular 1:5 to 5:1, based in each case on dry mixtures. It can also be advantageous to use a mixture of the dyes of the formulae (1), (2) and (3), employing either (2) or (3) as a shading dye in the proportions specified below.

Independently of the dyes employed, the dye mixtures of the invention may further comprise a shading colorant, preferably from the group consisting of C.I. Direct Red 1, 11, 37 62, 75, 81, 87, 89, 95, 227; C.I. Acid Red 1, 8, 87, 94, 115, 131, 144, 152, 154, 186, 245, and 289; C.I. Reactive Red 21, 22, 35, 63, 106, 107, 112, 113, 114, 126, 127, 128, 129, 130, 131, 137, 160, 161, 174; C.I. Pigment Red 122, 176, 184, 185, and 269. The shading colorant is preferably present in an amount from 0.001 to 5% by weight, in particular from 0.01 to 1% by weight, based on the dry weight of the overall mixture.

The dye mixtures of the invention can be prepared by mixing the dyes of the formulae (1) and (2), or (1) and (3), and, if desired, the shading colorant with one another in the stated proportions in the form of the dry powders, their solutions, water-moist or solvent-moist presscakes or masterbatches.

Dyes of the formula (1) can be prepared by diazotizing the aniline derivative of the formula (4)

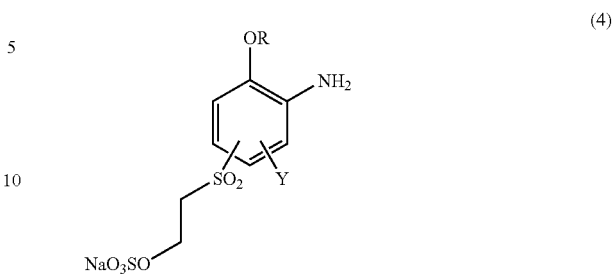

(4)

in which R is an alkyl radical, preferably methyl, ethyl or propyl, and coupling the resulting diazonium salt to a compound of the formula (5)

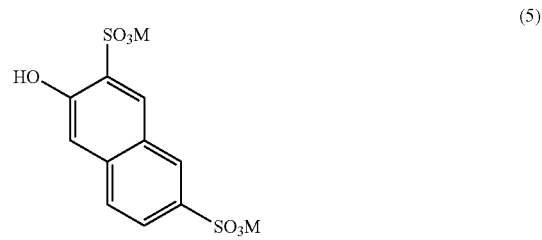

(5)

and complexing the resulting compound of the formula (6)

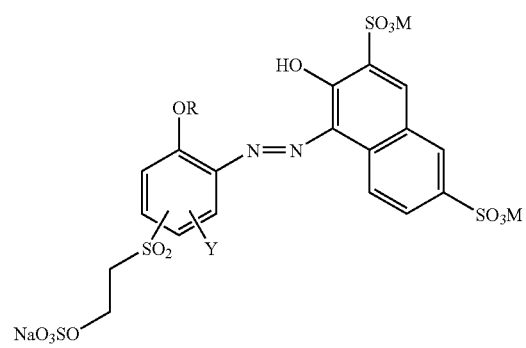

(6)

by reacting it with a metal salt solution to give the dye (7).

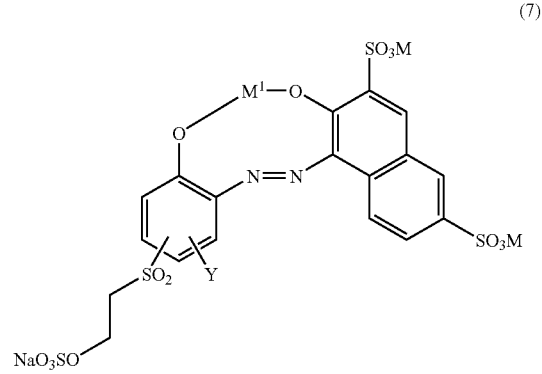

(7)

Finally, reaction takes place with the corresponding nucleophile to give the dye of the general formula (1).

An alternative option is first to react the amine (4) with a nucleophile to give the compound (8)

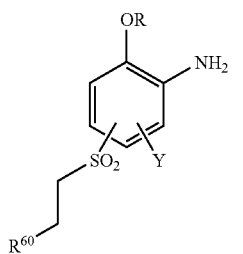

(8)

in which $R^{60}$ has the definition $OR^2$, $NR^3R^4$ or $SR^5$, then to diazotize this compound and to couple it to the unit (5) to give the monoazo compound (9)

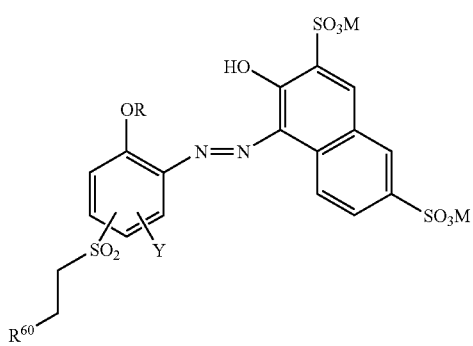

(9)

which is subsequently metalated to give (1).

The diazotization and coupling steps mentioned can be conducted according to standard methods.

The diazotization is preferably conducted in aqueous solution or suspension using sodium nitrite at temperatures from 0 to 10° C. and at a pH of between 1 and 3.

The azo coupling is preferably conducted in aqueous solution or suspension at temperatures from 0 to 20° C. and a pH of between 4 and 10.

The molar proportions between the respective diazonium salt and respective coupling component are preferably 1:(0.8 to 2).

Complexing with the metal $M^1$ takes place appropriately by adding an aqueous metal salt solution, e.g., a metal sulfate, chloride, bromide, hydrogen sulfate, bicarbonate or carbonate.

The dyes can also be prepared by continuously mixing equivalent amounts of the starting products in the form of aqueous-acidic or aqueous-alkaline solutions in, for example, mixing nozzles and flow-traversed reactors, where appropriate with an after-reaction phase in a reaction vessel.

The present invention also provides for the use of the specified mixtures for dyeing and printing natural and synthetic fiber materials (e.g., polyester, silk, wool, blend fabrics), in particular for recording text and images on various recording media, and also for coloring paper or celluloses in the pulp.

For use in recording liquids the dyes described are worked up in a manner appropriate to the stated requirements. The dyes can be isolated from the preferably aqueous reaction mixtures obtained initially, by salting out and filtration or by spray drying, where appropriate after partial or complete desalting by means of membrane filtration. It is, however, also possible to dispense with any isolation and to convert the dye-containing reaction mixtures directly into concentrated dye solutions by adding organic and/or inorganic bases, possibly humectants, preservatives and where appropriate after partial or complete desalting by means of membrane filtration. Alternatively, the dyes may also be used as presscakes (possibly also in flushing processes) or as powders. Advantageously, the dye mixtures of the invention are used in substantially salt-free form, i.e., free of NaCl or other customary inorganic salts formed during the synthesis of the dyes.

Inorganic bases suitable for concentrated dye solutions include for example lithium hydroxide, lithium carbonate, sodium hydroxide, sodium hydrogen carbonate, sodium carbonate, potassium hydroxide, potassium carbonate, and ammonia. Examples of suitable organic bases include monoethanolamine, diethanolamine, triethanolamine, 2-aminopropanol, 3-aminopropanol, dipropanolamine, tripropanolamine, N-methylaminoethanol, N,N-dimethylaminoethanol, N-phenylaminopropanol, ethylenediamine, tetramethylethylenediamine, tetramethylpropylenediamine, tetramethylhexylenediamine, diethylenetriamine, triethylenetetramine, triethylamine, diisopropylethylamine, and polyethylenimine.

Humectants suitable for concentrated dye solutions are for example formamide, urea, tetramethylurea, ε-caprolactam, ethylene glycol, diethylene glycol, triethylene glycol, polyethylene glycol, butylglycol, methyl-cellosolve, glycerol, N-methylpyrrolidone, 1,3-diethyl-2-imidazolidinone, sodium xylenesulfonate, sodium cumenesulfonate, and sodium butylmonoglycol sulfate.

The dye mixtures of the invention are particularly suitable for preparing recording liquids, especially inks, on an aqueous or nonaqueous basis for the ink-jet printing process, and also for those inks which operate according to the hot-melt process or are based on microemulsions, but also for other printing, duplicating, marking, writing, drawing, stamping or registering processes.

The present invention also provides recording liquids which comprise a dye mixture of the invention and, if desired, other colorants for shading. Such shading colorants are appropriately present in an amount of 0 to 20% by weight, preferably from 0.01 to 10% by weight, in particular of 0.1 to 5% by weight, based on the overall weight of the recording liquid. The composition of the recording liquid has to be adapted to the particular end use.

Recording liquids of the invention contain in general a total of 0.1 to 50% by weight of said mixture of the dyes (1) and (2), or (1) and (3), and, if present, of the shading colorants, reckoned as dry weight, 0 to 99% by weight of water, and 0.5 to 99.5% by weight of organic solvent and/or humectant. In one preferred embodiment the recording liquids contain 0.5 to 15% by weight of said dye mixture, reckoned as dry weight, 35 to 75% by weight of water, and 10 to 50% by weight of organic solvent and/or humectant; in another preferred embodiment 0.5 to 15% by weight of said dye mixture reckoned as dry weight, 0 to 20% by weight of water, and 70 to 99.5% by weight of organic solvent and/or humectant.

Water employed in preparing the recording liquids is preferably used in the form of distilled or demineralized water. The solvents and/or humectants present in the recording liquids can comprise an organic solvent or a mixture of such solvents, in which case water-miscible solvents are preferred. Suitable solvents are for example monohydric or polyhydric alcohols their ethers and esters, e.g., methanol, ethanol, propanol, isopropanol, butanol, isobutanol; dihydric or trihydric alcohols, particularly of 2 to 6 carbon atoms, e.g., ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as ethylene glycol monomethyl, monoethyl or monobutyl ether, triethylene glycol monomethyl or monoethyl ether; ketones and ketone alcohols such as acetone, methyl ethyl ketone, diethyl ketone, methyl isobutyl ketone, methyl pentyl ketone, cyclopentanone, cyclohexanone, diacetone alcohol; amides, such, as dimethylformamide, dimethylacetamide, N-methylpyrrolidone; also urea, tetramethylurea, thiodiglycol, ε-caprolactam.

The recording liquids of the invention may further comprise customary additives, examples being preservatives, cationic, anionic or nonionic surface-active substances (surfactants and wetting agents) and also viscosity regulators, e.g., polyvinyl alcohol, cellulose derivatives, or water-soluble natural or synthetic resins as film formers or binders to enhance the adhesion and abrasion resistance. Light stabilizers may additionally be present.

Also possibly present are amines, such as ethanolamine, diethanolamine, triethanolamine, N,N-dimethylethanolamine, diisopropylamine, for raising the pH of the recording liquid, normally at 0 to 10% by weight, preferably from 0.5 to 5% by weight, based on the overall weight of the recording liquid.

The recording liquids for the ink-jet printing process may have added to them, depending on the embodiment of this printing process, for example, as a continuous jet, intermittent jet, pulsed jet or compound jet process, further additives, for example, for buffering the pH, for adjusting the electroconductivity, the specific heat, the thermal expansion coefficient, and the conductivity.

The storage of recording liquids of the invention is not accompanied by deposition of precipitates leading to fuzzy printed images or to the clogging of nozzles.

The viscosity and surface tension of the recording liquids of the invention places them within the ranges suitable for ink-jet processes. They give printed images of high optical density with excellent light fastness and water fastness.

Furthermore, the magenta dye mixture of the invention can be used as an ink set in combination with black, yellow and/or cyan colorants. The yellows and cyans involve not only dyes, such as the C.I. dyes Acid Yellow 17, C.I. Acid Yellow 23, C.I. Direct Yellow 86, C.I. Direct Yellow 98, C.I. Direct Yellow 132, C.I. Reactive Yellow 37, C.I. Acid Blue 9, C.I. Direct Blue 199, but also pigments, such as C.I. Pigment Yellow 17, C.I. Pigment Yellow 74, C.I. Pigment Yellow 83, C.I. Pigment Yellow 97, C.I. Pigment Yellow 120, C.I. Pigment Yellow 139, C.I. Pigment Yellow 151, C.I. Pigment Yellow 155, C.I. Pigment Yellow 180, C.I. Pigment Violet 19, C.I. Pigment Blue 15, C.I. Pigment Blue 15:3, C.I. Pigment Blue 15:4. The blacks are preferably C.I. Food Black 1 and 2, C.I. Direct Black 168, C.I. Direct Black 195, C.I. Reactive Black 8, C.I. Reactive Black 31, C.I. Sol. Sulfur Black 1, Carbon Black.

In the case of the reactive dyes, even dyes which have been reacted with nucleophiles can be used in ink sets.

Moreover, the dye mixtures of the invention are suitable for use as colorants in electrophotographic toners and developers, such as one-component and two-component powder toners, magnetic toners, liquid toners, polymerization toners, and other, specialty toners.

Typical toner binders are addition polymerization, polyaddition, and polycondensation resins, such as styrene, styrene-acrylate, styrene-butadiene, acrylate, polyester, phenolic-epoxy resins, polysulfones, polyurethanes, individually or in combination, and also polyethylene and polypropylene, which may include further ingredients, such as charge control agents, waxes or flow agents, or may have such ingredients added subsequently.

Dye mixtures of the invention are further of utility as colorants in powders and powder coating materials, especially in carboelectrically or electrostatically sprayed powder coating materials, which are used to coat the surface of articles made, for example, of metal, wood, plastic, glass, ceramic, concrete, textile material, paper or rubber.

Powder coating resins employed are typically epoxy resins, carboxyl- and hydroxyl-containing polyester resins, polyurethane resins and acrylic resins together with customary curing agents. Combinations of resins are also used. For instance, epoxy resins are frequently employed in combination with carboxyl- and hydroxyl-containing polyester resins.

Moreover, the dye mixtures of the invention are suitable for use as colorants for color filters, for both additive and subtractive color generation (P. Gregory "Topics in Applied Chemistry: High Technology Applications of Organic Colorants" Plenum Press, New York 1991, page 15–25), and also as colorants in electronic inks for "electronic newspapers".

In the above-described application fields as well the dye mixtures of the invention can additionally be shaded with other dyes and/or pigments, such as with C.I. Direct Red 1, 11, 37, 62, 75, 81, 87, 89, 95, and 227; C. I. Acid Red 1, 8, 87, 94, 115, 131, 144, 152, 154, 186, 245, and 289; C.I. Pigment Red 57:1, 122, 146, 176, 184, 185, and 269.

In the examples which follow the light fastness is determined according to DIN 54003 (blue wool scale). On that scale, 1 is very low, 2 is low, 3 is moderate, 4 is fairly good, 5 is good, 6 is very good.

EXAMPLE 1

Preparation of Dye (1)

a) Diazotization of Amine Component (4)

16.67 g (0.05 mol) of amine component (4) (R=methyl, Y=H) are introduced into 20 ml of 10N hydrochloric acid, 20 ml of salt-free water are added, and the mixture is stirred for 30 minutes. The temperature is then adjusted to 0 to 5° C. with 20 g of ice, 3.62 g of sodium nitrite are added over the course of 1.5 hours, and the mixture is stirred at 5 to 8° C. for 3 hours. The excess of nitrite is removed with amidosulfonic acid.

b) Coupling to form Monoazo Dye (6)

17.41 g (0.05 mol) of coupling component (5) (M=Na) are stirred into 60 ml of salt-free water, the pH is adjusted to 6 to 9 with 10N sodium hydroxide solution, and 25 g of ice are added. The reaction mixture prepared under a) is added dropwise to this solution, the pH is maintained using sodium carbonate, and the mixture is stirred until conversion is quantitative. Alternatively, the coupling component can also be added dropwise to the diazo solution, or the two reactants can be mixed together continuously in the requisite molar ratios.

c) Demethylating Coppering

The dye solution obtained in b) is adjusted to a pH of 3–5 with 10N hydrochloric acid, admixed with 12.98 g (0.052 mol) of copper sulfate×5H$_2$O and with 11.3 g of sodium acetate, and stirred at 95° C. for 48 hours. After cooling to room temperature, the reaction solution is admixed with Na thiosulfate×5H$_2$O and stirred at 90° C. for 4 hours. Finally, the dye solution is filtered. Alternatively, the metalation may also take place in a pressure reactor or by the process described in Example 2d).

c) Reaction with Diethanolamine 15.77 g (0.15 mol) of diethanolamine, dissolved in 50 ml of demineralized water, are added to the dye solution. The pH is then adjusted to 9–10 with 10N sodium hydroxide solution and the mixture is heated at 60° C. for 30 minutes to give dye (1) in dissolved form.

EXAMPLE 2

Preparation of Dye (1)

a) Reaction of Amine (4) with Diethanolamine 16.67 g (0.05 mol) of amine component (4) are dissolved in 50 ml of demineralized water and at a pH of 8.5–10 5.78 g (0.055 mol) of diethanolamine are added. The temperature is raised to 60° C. for 1 hour.

b) Diazotization of Amine Component (8)

25 ml of 10N hydrochloric acid in 20 ml of water are added to the reaction solution obtained under a). After 30 minutes of stirring the mixture is cooled to 0–5° C. by adding 25 g of ice, and 3.62 g of sodium nitrite are added over the course of 1.5 hours. The mixture is stirred at 5–8° C. for 3 hours and then the excess nitrite is removed with aminosulfone.

c) Coupling to Form Monoazo Dye (9)

17.41 g (0.05 mol) of coupling component (5) (M=Na) are stirred into 60 ml of salt-free water, the pH is adjusted to 6–9 with 10N sodium hydroxide solution, and 25 g of ice are added. The reaction mixture prepared under b) is added dropwise to this solution, the pH is maintained with sodium carbonate, and the mixture is stirred until conversion is complete.

Alternatively, the coupling component can also be added dropwise to the diazo solution.

d) Demethylating Coppering 12.98 g (0.052 mol) of copper sulfate×5H$_2$O are dissolved in 20 ml of demineralized water, 20.8 ml of ammonia (25% strength) are added and the mixture is heated at 60° C. for 10 minutes. The dye solution obtained from c) is admixed with 12.3 g (0.117 mol) of diethanolamine (99% pure) and then the copper complex solution is added. The mixture is subsequently heated at 90° C. for 3 hours at a pH of 9–10 and the conversion is monitored by TLC. The excess ionic copper is removed by adding Na thiosulfate ×5H$_2$O and heating at 90° C. for 4 hours by subsequent filtration.

EXAMPLE 3

Preparation of a Recording Liquid

A 10% strength by weight salt-free aqueous solution of each dye with the general formula (1) (with $R^1$=CH$_2$CH$_2$NR$^3$R$^4$, $R^3$=R$^4$=CH$_2$CH$_2$OH and Y=H; SO$_2$R$^1$ is positioned meta to the azo bridge) and of the formula (2) (with $R^1$=CH$_2$CH$_2$OR$^2$, $R^2$=SO$_3$M, $R^9$=COC$_6$H$_5$ known as C.I. Reactive Red 180) is prepared. Subsequently, at room temperature, 1500 ml of dye solution (1) are mixed with 498 ml of dye solution (2). Additionally, for shading, 2 ml of a 1% strength by weight C.I. Acid Red 186 solution are stirred in. The resultant dye solution is preserved with 4 g of ®Proxel GXL.

Absorption spectrum in water: $\lambda_{max}$=519 nm;
Light fastness: 5 (blue wool scale);
Storage stability test: no solid particles after 6 weeks at 50° C. and 10 days at −20° C.; surface tension: >50 mN/m (4% strength aqueous ink).

EXAMPLE 4

Preparation of a Recording Liquid 2000 ml of a 10% strength by weight salt-free solution of the dye having the general formula (1) (with $R^1$=CH$_2$CH$_2$NR$^3$R$^4$, $R^3$=H, $R^4$—CH$_2$CH$_2$SO$_3$M and Y=H; SO$_2$R$^1$ is positioned meta to the azo bridge) are mixed with 498 ml of a likewise demineralized 10% strength by weight solution of C.I. Reactive Red 180. The color solution is preserved by adding 0.2% by volume of ®Mergal K10 N.

Absorption spectrum in water: $\lambda_{max}$=522 nm;
Light fastness: 5;
Storage stability: no solid particles after 6 weeks at 50° C. and 10 days at −20° C.;
Surface tension: >50 mN/m (4% strength aqueous ink).

EXAMPLE 5

Preparation of a Recording Liquid 1000 ml of a 10% strength by weight salt-free solution of the dye having the general formula (1) (with $R^1$=CH$_2$CH$_2$NR$^3$R$^4$, $R^3$=H, $R^4$=CH$_2$CO$_2$M and Y=H; SO$_2$R$^1$ is positioned meta to the azo bridge) are admixed with 10 ml of a likewise demineralized 10% strength by weight solution of C.I. Reactive Red 180. The pH of the solution is adjusted to 3.5–4.5. The dye solution is preserved with 0.2% by volume of Proxel GXL.

Absorption spectrum in water: $\lambda_{max}$=517 nm;
Light fastness: 5;
Storage stability test: no solid particles after 4 weeks at 50° C. and 10 days at −20° C.
Surface tension: >50 mN/m (4% strength aqueous ink).

EXAMPLE 6

Preparation of a Recording Liquid

A 10% strength by weight salt-free aqueous solution of each dye with the general formula (1) (with $R^1$=CH$_2$CH$_2$NR$^3$R$^4$, $R^3$=R$^4$=CH$_2$CH$_2$OH and Y=H; SO$_2$R$^1$ is positioned meta to the azo bridge) and of the formula (3) known as C.I. Acid Red 52 is prepared. Subsequently, at room temperature, 1500 ml of dye solution are mixed with 498 ml of Acid Red 52 solution. Additionally, for shading, 2 ml of a 1% strength by weight C.I. Acid Red 186 solution are stirred in. The resultant dye solution is preserved with 4 g of ®Proxel GXL.

Absorption spectrum in water: $\lambda_{max}$=533 nm;
Light fastness: 5 (blue wool scale);
Storage stability test: no solid particles after 6 weeks at 50° C. and 10 days at −20° C.;
Surface tension: >50 mN/m (4% strength aqueous ink).

EXAMPLE 7

Preparation of a Recording Liquid 2000 ml of a 10% strength by weight salt-free solution of the dye having the general formula (1) (with $R^1$=CH$_2$CH$_2$NR$^3$R$^4$, $R^3$=H, $R^4$=CH$_2$CH$_2$SO$_3$M and Y=H; SO$_2$R$^1$ is positioned meta to the azo bridge) are mixed with 498 ml of a likewise demineralized 10% strength by weight solution of C.I. Acid Red 52. The color solution is preserved by adding 0.2% by volume of ®Mergal K10 N.

Absorption spectrum in water: $\lambda_{max}$=536 nm;
Light fastness: 5;
Storage stability: no solid particles after 6 weeks at 50° C. and 10 days at −20° C.;
Surface tension: >50 mN/m (4% strength aqueous ink).

EXAMPLE 8

Preparation of a Recording Liquid 2000 ml of a 10% strength by weight salt-free solution of the dye having the general formula (1) (with $R^1=CH_2CH_2NR^3R^4$, $R^3=R^4=CH_2CH_2OH$ and $Y=H$; $SO_2R^1$ is positioned meta to the azo bridge) are mixed with 498 ml of a likewise demineralized 10% strength by weight solution of C.I. Acid Red 52. The color solution is preserved by adding 0.2% by volume of ®Mergal K10 N.

Absorption spectrum in water: $\lambda_{max}=528$ nm;
Light fastness: 5;
Storage stability: no solid particles after 6 weeks at 50° C. and 10 days at −20° C.;
Surface tension: >50 mN/m (4% strength aqueous ink).

EXAMPLE 9

Preparation of a Recording Liquid 2000 ml of a 10% strength by weight salt-free solution of the dye having the general formula (1) (with $R^1=CH_2CH_2NR^3R^4$, $R^3=H$, $R^4=CH_2CH_2OH$ and $Y=H$; $SO_2R^1$ is positioned meta to the azo bridge) are mixed with 498 ml of a likewise demineralized 10% strength by weight solution of C.I. Reactive Red 180. The color solution is preserved by adding 0.2% by volume of ®Mergal K10 N.

Absorption spectrum in water: $\lambda_{max}=525$ nm;
Light fastness: 5;
Storage stability: no solid particles after 6 weeks at 50° C. and 10 days at −20° C.;
Surface tension: >50 mN/m (4% strength aqueous ink).

What is claimed is:

1. A dye mixture consisting essentially of a dye of the formula (1) and a dye of the formula (2) or (3)

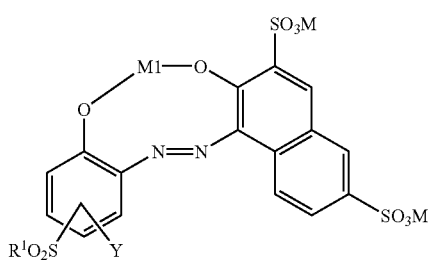

(1)

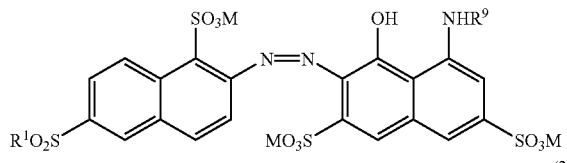

(2)

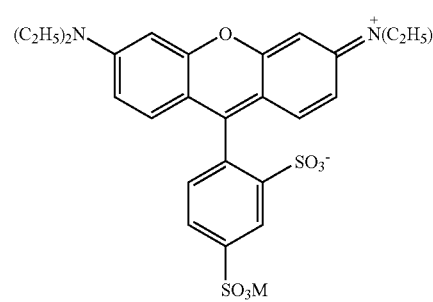

(3)

in which
Y is H, $(C_1-C_6)$-alkyl or $(C_1-C_6)$-alkoxy,
$R^1$ is OM, $CH=CH_2$, $CH_2CH_2OR^2$, $CH_2CH_2NR^3R^4$, $CH_2CH_2SR^5$ or $CH_2CH_2CR^6R^7R^8$,
$R^2$ is H, $SO_3M$, $(C_1-C_6)$-alkyl, $(C_1-C_6)$-alkyl which is branched or unbranched and is unsubstituted or substituted by one or more radicals selected from the group consisting of OH, $NH_2$, COOM and $SO_3M$;
$(C_1-C_6)$-acyl, $(C_6-C_{10})$-aryl, $C_6-C_{10}$-aryl which is substituted by one or more radicals selected from the group consisting of halogen, OH, $NH_2$, COOM and $SO_3M$; or 5–10-membered heterocycles having 1 to 4 heteroatoms selected from the group consisting of O, N and S;
$R^3$ and $R^4$ independently of one another are H, $(C_1-C_6)$-alkyl, $(C_1-C_6)$-alkyl which is unbranched or branched and unsubstituted or substituted by one or more radicals selected from the group consisting of OH, $NH_2$, COOM and $SO_3M$; $(C_1-C_6)$-acyl, $C_6-C_{10}$-aryl, $C_6-C_{10}$-aryl substituted by one or more radicals selected from the group consisting of OH, halogen, $NH_2$, COOM and $SO_3M$;
$R^5$ is $(C_1-C_6)$-alkyl, $(C_1-C_6)$-alkyl which is unbranched or branched and unsubstituted or substituted by one or more radicals selected from the group consisting of OH, $NH_2$, COOM and $SO_3M$; $(C_1-C_6)$ acyl, $C_6-C_{10}$-aryl, $C_6-C_{10}$-aryl substituted by one or more radicals selected from the group consisting of OH, halogen, $NH_2$, COOM and $SO_3M$;
$R^6$, $R^7$, $R^8$ independently of one another are hydrogen, $(C_1-C_6)$-alkyl or are $(C_1-C_6)$-alkyl substituted by one or more radicals selected from the group consisting of halogen, OH, $NH_2$, $COOCH_3$, COOM and $SO_3M$;
$R^9$ is H, $(C_1-C_6)$-alkyl, a $(C_1-C_6)$-alkyl which is unbranched or branched and is substituted by one or more radicals selected from the group consisting of OH, $NH_2$, COOM and $SO_3M$; $(C_1-C_6)$-acyl, $C_6-C_{10}$-aryl, a $C_6-C_{10}$-aryl substituted by one or more radicals selected from the group consisting of OH, halogen, $NH_2$, COOM and $SO_3M$;
M1 is Cu, Co, Ni, Fe, Cr or ⅔ Al; and
M is hydrogen, a monovalent metal cation, one equivalent of a polyvalent metal cation, or an ammonium ion optionally substituted by $(C_1-C_4)$-alkyl; $(C_1-C_4)$-alkoxy-$(C_1-C_4)$-alkyl, hydroxy-$(C_1-C_4)$-alkyl, benzyl or $(C_6-C_{10})$-aryl.

2. The dye mixture of claim 1, wherein M is hydrogen, sodium, lithium or potassium.

3. The dye mixture of claim 1, wherein Y is hydrogen, methyl, ethyl, methoxy or ethoxy.

4. The dye mixture of claim 1, wherein $R^1$ is OH, $CH=CH_2$, $CH_2CH_2OR^2$ or $CH_2CH_2NR^3R^4$.

5. The dye mixture of claim 1, wherein $R^2$ is hydrogen, $SO_3M$, methyl, ethyl, acetyl, phenyl, chlorophenyl, phenylsulfonic acid, morpholinyl or pyridinyl.

6. The dye mixture of claim 1, wherein $R^9$ is hydrogen, methyl, ethyl, acetyl, benzoyl, phenyl or halogen-, COOM- or $SO_3M$-substituted phenyl or benzoyl.

7. The dye mixture of claim 1, wherein the proportion between the dyes of the formulae (1) and (2), and also (1) and (3), based on dry weights, is 100:1 to 1:100.

8. The dye mixture of claim 1, wherein the dye of the formula (1) is C.I. Reactive Red 23, the dye of the formula (2) is C.I. Reactive Red 180, and the dye of the formula (3) is C.I. Acid Red 52.

9. The dye mixture of claims 1, further comprising a shading dye from the group consisting of C.I. Direct Red 1, 11, 37 62, 75, 81, 87, 89, 95, 227; C.I. Acid Red 1, 8, 87, 94, 115, 131, 144, 152, 154, 186, 245, and 289; C.I. Reactive Red 21, 22, 35, 63, 106, 107, 112, 113, 114, 126, 127, 128, 129, 130, 131, 137, 160, 161, 174; C.I. Pigment Red 122, 176, 184, 185, and 269.

10. A process for preparing a dye mixture of claim 1, comprising the step of mixing the dyes of the formulae (1) and (2), or (1) and (3), to form a modure, wherein the mixture is in a form selected from the group consisting of dry powders, solutions, water-moist or solvent-moist press-cakes and masterbatches.

11. A dyed composition comprising a dye mixture of claim 1, wherein the composition is selected from the group consisting of natural fiber materials synthetic fiber materials, recording mediums, paper and pulp cellulose.

12. A recording liquid comprising a dye mixture of claim 1.

13. The recording liquid of claim 12, consisting essentially of 0.1 to 50% by weight, dry weight, of dye mixture, 0 to 99% by weight of water, and 0.5 to 99.5% by weight of organic solvent and/or humectant.

14. An ink-jet ink comprising the recording liquid of claim 12.

15. An ink set consisting of a magenta-colored recording liquid of claim 12, a black recording liquid, a yellow recording liquid and/or a cyan-colored recording liquid.

16. The dye mixture of claim 1, wherein the proportion between the dyes of the formulae (1) and (2), and also (1) and (3), based on dry weights, is 10:1 to 1:10.

17. The process of claim 10, wherein mixing step further comprises mixing a shading dye with the dyes of the formulae (1) and (2), or (1) and (3).

* * * * *